United States Patent [19]

Noguchi et al.

[11] Patent Number: 4,958,893
[45] Date of Patent: Sep. 25, 1990

[54] SEMICONDUCTOR LASER BEAM SOURCE APPARATUS

[75] Inventors: Masaru Noguchi; Masafumi Yamamoto, both of Kanagawa, Japan

[73] Assignee: Fuji Photo Film Co., Ltd., Kanagawa, Japan

[21] Appl. No.: 837,224

[22] Filed: Mar. 7, 1986

[30] Foreign Application Priority Data

Mar. 11, 1985 [JP] Japan .................................. 60-48076

[51] Int. Cl.⁵ .............................................. G02B 26/08
[52] U.S. Cl. ...................................... 350/6.6; 350/6.5
[58] Field of Search ................... 350/6.1, 6.2, 6.3, 6.4, 350/6.5, 6.6, 6.7, 6.8, 6.9, 6.91, 174, 486, 612, 613, 616; 362/259

[56] References Cited

U.S. PATENT DOCUMENTS

| 3,900,262 | 8/1975 | Baxter | 350/613 |
| 4,085,322 | 4/1978 | Sick | 350/616 |

FOREIGN PATENT DOCUMENTS

| 0159023 | 10/1985 | European Pat. Off. | 350/6.6 |
| 890379 | 2/1962 | United Kingdom | 350/6.5 |

*Primary Examiner*—Bruce Y. Arnold
*Assistant Examiner*—J. Ryan
*Attorney, Agent, or Firm*—Sughrue, Mion, Zinn, MacPeak & Seas

[57] ABSTRACT

In a semiconductor laser beam source apparatus, laser beams emitted by a plurality of semiconductor lasers, collimated and made parallel to each other are coalesced by a converging lens. The laser beams are respectively reflected by a plurality of reflecting mirrors having reflecting surfaces parallel to each other and guided to the converging lens. The reflecting mirrors respectively have a mounting surface at a predetermined angle with respect to the reflecting surface and are secured to a common plane.

6 Claims, 3 Drawing Sheets

F I G. 4
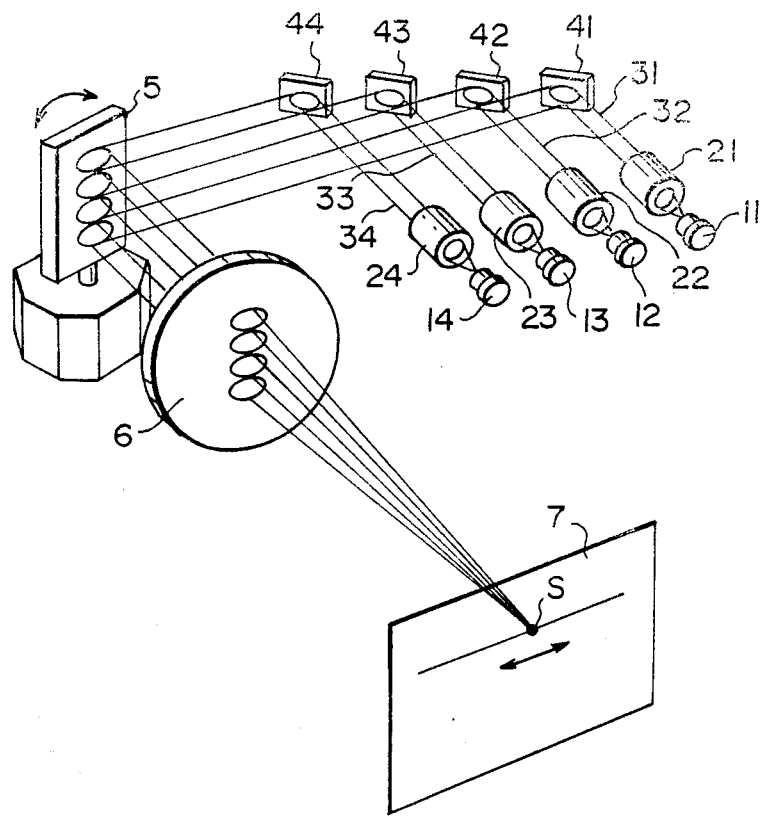

SEMICONDUCTOR LASER BEAM SOURCE APPARATUS

BACKGROUND OF THE INVENTION

1. Field of the Invention

This invention relates to a semiconductor laser beam source apparatus used for a light beam scanning apparatus. This invention particularly relates to a semiconductor laser beam source apparatus wherein laser beams emitted by a plurality of semiconductor lasers are coalesced on an object to get a multiplied power of the laser beams on the object.

2. Description of the Prior Art

Light beam scanning apparatuses wherein a light beam is deflected and scanned by a light deflector have heretofore been widely used, for example, in scanning recording apparatuses and scanning read-out apparatuses. As one of the means for generating a light beam in the light beam scanning apparatuses, a semiconductor laser is used. The semiconductor laser has various advantages over a gas laser or the like in that the semiconductor laser is small, cheap and consumes little power, and that the laser beam can be modulated directly by changing the drive current.

However, the output of the semiconductor laser is low (20 mW to 30 mW) when oscillation is conducted continuously. Therefore, the semiconductor laser is not suitable for use in a light beam scanning apparatus wherein a scanning light beam of high energy is necessary, for example, a scanning recording apparatus for recording an image on a recording material having low sensitivity such as a draw material (metal film, amorphous film, or the like).

On the other hand, when certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a stimulable phosphor sheet provided with a layer of the stimulable phosphor is first exposed to a radiation passing through an object to have a radiation image stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, it is desired to use a light beam scanning apparatus using a semiconductor laser for reading out the radiation image stored on the stimulable phosphor sheet by scanning the sheet. However, in order to cause the stimulable phosphor sheet to emit light in proportion to the stored radiation energy, it is necessary to expose the stimulable phosphor sheet to stimulating rays having a sufficiently high level of energy. Accordingly, it is not always possible to use a light beam scanning apparatus using a semiconductor laser for image read-out in the radiation image recording and reproducing system.

In order to obtain a scanning laser beam of sufficiently high energy from the semiconductor laser of low light output, a plurality of semiconductor lasers may be used, and the laser beams emitted by the semiconductor lasers may be coalesced. One such semiconductor laser beam source apparatus for coalescing a plurality of laser beams is disclosed in Japanese Patent Application No. 59(1984)-121089. In this apparatus, the semiconductor lasers are positioned so that the optical axes of the laser beams are parallel to each other, and laser beams are converted into parallel rays by collimator lenses and then converged to a common spot by a converging lens.

In the aforesaid semiconductor laser beam source apparatus, in order to prevent the converging lens and the light deflector from becoming large and to minimize adverse effects of aberration of the converging lens, it is desired that the laser beams be as close to each other as possible when they impinge upon the converging lens. However, the general semiconductor laser which is available commercially has a large case, and it is not always possible to make the laser beams sufficiently close to each other. FIG. 4 is a perspective view showing an example of a proposed semiconductor laser beam source apparatus. In the apparatus of FIG. 4, in order to avoid the aforesaid problem, laser beams 31, 32, 33 and 34 emitted respectively by semiconductor lasers 11, 12, 13 and 14 and converted by collimator lenses 21, 22, 23 and 24 into parallel rays are reflected by reflecting mirrors 41, 42, 43 and 44 positioned so that their reflecting surfaces are parallel to each other. In this manner, large spaces are maintained between the semiconductor lasers 11, 12, 13 and 14, and the spaces between the laser beams 31, 32, 33 and 34 impinging upon a light deflector 5 and a converging lens 6 are decreased. The laser beams 31, 32, 33 and 34 made close to each other are deflected by the light deflector 5 constituted by a galvanometer mirror or the like and converged by the converging lens 6 to a spot S to scan on a scanning surface 7.

However, when the reflecting mirrors 41, 42, 43 and 44 are positioned to correspond to the laser beams 31, 32, 33 and 34 as described above, the directions of the reflecting surfaces of the reflecting mirrors 41, 42, 43 and 44 must be strictly adjusted so that the laser beams 31, 32, 33 and 34 are accurately parallel to each other when impinging upon the converging lens 6. The adjustment is not always possible to achieve.

SUMMARY OF THE INVENTION

The primary object of the present invention is to provide a semiconductor laser beam source apparatus which facilitates adjustment for making a plurality of laser beams impinging upon a converging lens parallel to each other.

Another object of the present invention is to provide a semiconductor laser beam source apparatus which improves the light beam scanning accuracy.

The present invention provides a semiconductor laser beam source apparatus in which laser beams emitted by a plurality of semiconductor lasers, collimated and made parallel to each other are coalesced by a converging lens, wherein said laser beams are respectively reflected by a plurality of reflecting mirrors having reflecting surfaces parallel to each other and guided to said converging lens, and said reflecting mirrors respectively have a mounting surface at a predetermined angle with respect to the reflecting surface and are secured to a common plane.

In the semiconductor laser beam source apparatus of the present invention, adjustment of positions of the reflecting mirrors for changing the spaces between the laser beams becomes unnecessary. Also, since the reflecting surfaces of the reflecting mirrors are accurately adjusted parallel to each other, it becomes possible to adjust the positions of the semiconductor lasers and the collimator lenses easily and accurately. Accordingly, the accuracy of scanning with the coalesced laser beam is improved markedly.

BRIEF DESCRIPTION OF THE DRAWINGS

FIG. 4 is a perspective view showing an example of a semiconductor laser beam source apparatus.

DESCRIPTION OF THE PREFERRED EMBODIMENTS

The present invention will hereinbelow be described in further detail with reference to the accompanying drawings.

Figure 1:
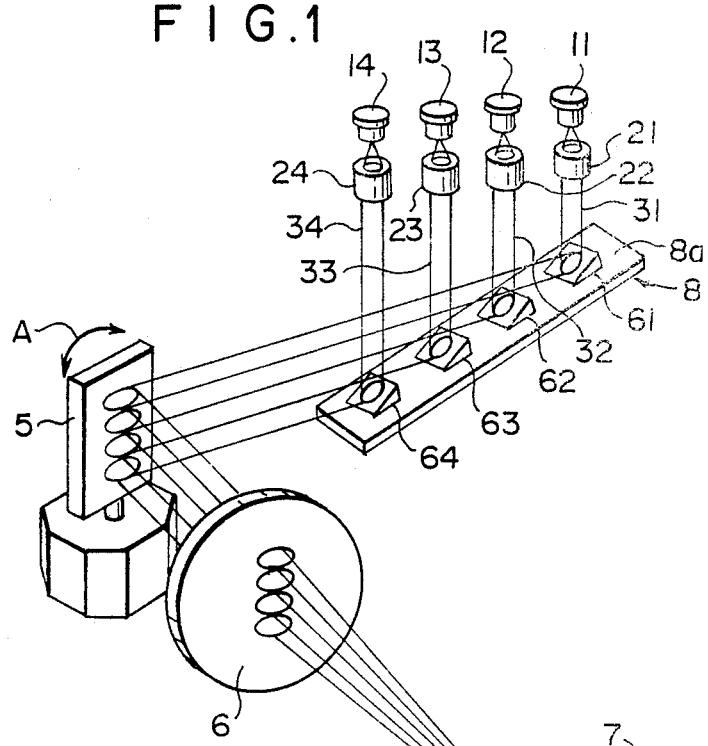
FIGS. 1 and 2 are a perspective view and a schematic view showing an embodiment of the semiconductor laser beam source apparatus in accordance with the present invention.

Referring to FIG. 1, semiconductor lasers 11, 12, 13 and 14 are positioned so that their beam emission axes are parallel to each other, and collimator lenses 21, 22, 23 and 24 and reflecting mirrors 61, 62, 63 and 64 are respectively positioned to correspond to the semiconductor lasers 11, 12, 13 and 14. Laser beams 31, 32, 33 and 34 emitted by the semiconductor lasers 11, 12, 13 and 14 are converted by the collimator lenses 21, 22, 23 and 24 into parallel rays which are then reflected by the reflecting mirrors 61, 62, 63 and 64 and deflected by a light deflector 5 swung in both ways in the direction as indicated by the arrow A. The laser beams 31, 32, 33 and 34 thus deflected impinge upon a common converging lens 6 and are converged thereby to a common coalesced beam spot S. Therefore, when a scanning surface 7 is positioned at the point where the spot S is formed, the scanning surface 7 is scanned in the direction as indicated by the arrow B by the scanning laser beam of high energy formed by coalescing the laser beams 31, 32, 33 and 34 emitted by the semiconductor lasers 11, 12, 13 and 14. Normally, the scanning surface 7 is positioned in the straight form, and an $f\theta$ lens is used as the converging lens 6.

Figure 2:
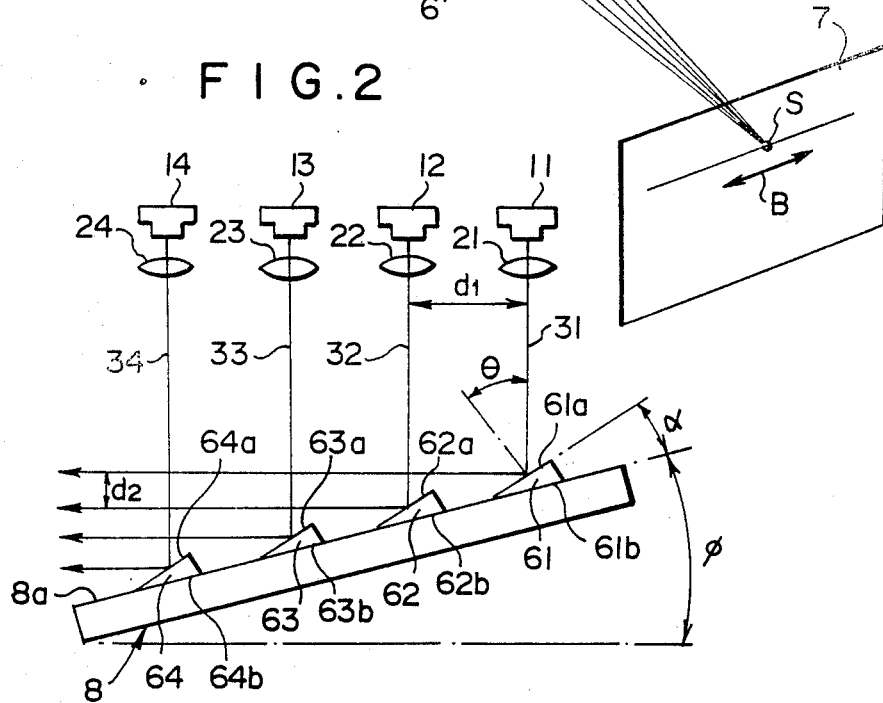

As shown in FIG. 2, since the laser beams 31, 32, 33 and 34 are reflected by the reflecting mirrors 61, 62, 63 and 64, it is possible to make the spaces d2 between the laser beams 31, 32, 33 and 34 after they are reflected by the reflecting mirrors 61, 62, 63 and 64 smaller than the spaces between the laser beams 31, 32, 33 and 34 impinging upon the reflecting mirrors 61, 62, 63 and 64, i.e. the space d1 between the beam emission axes of the semiconductor lasers 11, 12, 13 and 14. As described above, by making the beam space d2 small, it becomes possible to use a small light deflector 5 and a small converging lens 6 and to eliminate adverse effects of aberration of the converging lens 6 on the laser beams 31, 32, 33 and 34. Normally, the beam space d2 is adjusted to a value within the range of 0.5 to 3 times the beam diameter 1 (for example, the beam width at which the intensity is $1/e^2$ times the value at the center), typically within the range of one to two times the beam diameter. The space d1 between the beam emission axes is adjusted to a value at which adjustment of the semiconductor lasers 11, 12, 13 and 14 and the collimator lenses 21, 22, 23 and 24 is possible by taking into consideration the case sizes of the semiconductor lasers 11, 12, 13 and 14. When the general semiconductor lasers available commercially are used as the semiconductor lasers 11, 12, 13 and 14, the space d1 is about 10 mm at the minimum.

As shown in FIG. 2, the reflecting mirrors 61, 62, 63 and 64 acting as described above have a triangular cross-section, and have mounting surfaces 61b, 62b, 63b and 64b at a predetermined angle a with respect to the reflecting surfaces 61a, 62a, 63a and 64a. The reflecting mirrors 61, 62, 63 and 64 are secured to a mounting plate 8 with the mounting surfaces 61b, 62b, 63b and 64b closely contacting a common plane 8a of the mounting plate 8. The angle $\alpha$ may be adjusted accurately, for example, by fabricating the reflecting mirrors 61, 62, 63 and 64 by use of the same jig. Therefore, it is possible to position the reflecting surfaces 61a, 62a, 63a and 64a of the reflecting mirrors 61, 62, 63 and 64 accurately parallel to each other, and no position adjustment for making the reflecting surfaces parallel to each other is required. In order to make the laser beams 31, 32, 33 and 34 accurately parallel to each other, a television camera may be positioned at the spot S, the spot S may be enlarged and displayed on a monitor television, and the positions of the semiconductor lasers 11, 12, 13 and 14 and the collimator lenses 21, 22, 23 and 24 with respect to each other may be adjusted in three directions by a known mechanism by monitoring of the enlarged image of the spot S. In this case, since the reflecting surfaces 61a, 62a, 63a and 64a of the reflecting mirrors 61, 62, 63 and 64 are made accurately parallel to each other, the allowances of the position adjustment of the semiconductor lasers 11, 12, 13 and 14 and the collimator lenses 21, 22, 23 and 24 become small, and the adjustment accuracy becomes high.

As shown in FIG. 2, when the angle of the common plane 8a with respect to the plane normal to the beam emission axes of the semiconductor lasers 11, 12, 13 and 14 is $\phi$, the angle $\theta$ of incidence of the beam upon each of the reflecting surfaces 61a, 62a, 63a and 64a is represented by $$\theta = \alpha + \phi.$$

Also, the ratio of the beam space d2 to the beam space d1 is represented by $$d2/d1 = \cos(\phi + 2\alpha)/\cos\phi$$

Figure 3:
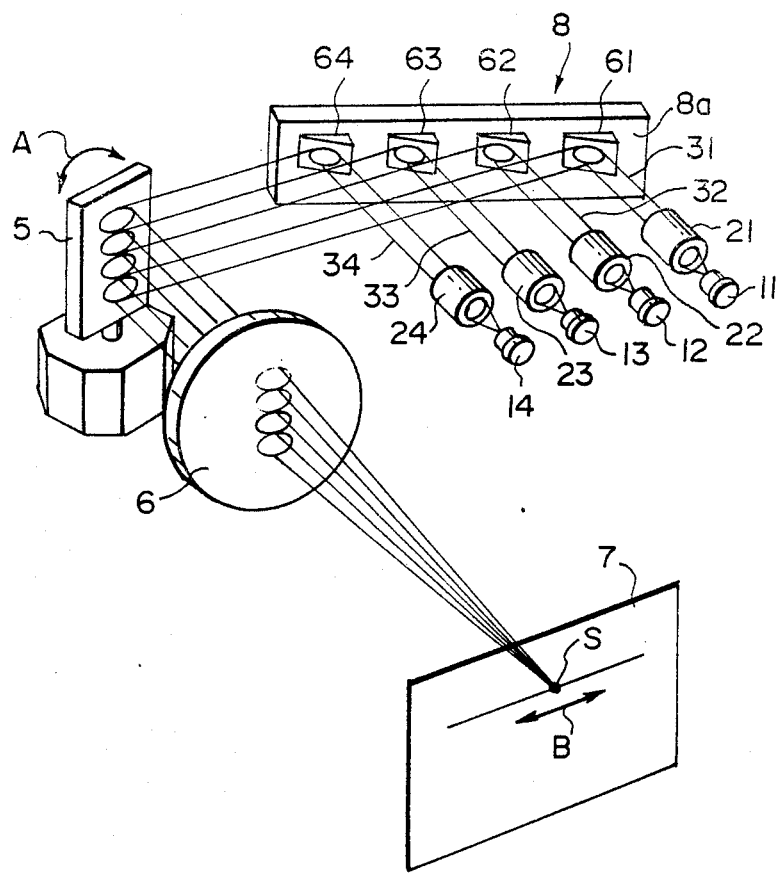
FIG. 3 is a perspective view showing another embodiment of the semiconductor laser beam source apparatus in accordance with the present invention.

The positions of the semiconductor lasers 11, 12, 13 and 14 with respect to the light deflector 5 are not limited to those shown in FIG. 1. For example, as shown in FIG. 3, the semiconductor lasers 11, 12, 13 and 14 may be positioned horizontally at different levels so that the laser beams 31, 32, 33 and 34 are emitted in the horizontal direction.

We claim:

1. A semiconductor laser beam source apparatus in which laser beams emitted by a plurality of semiconductor lasers, collimated and made parallel to each other are coalesced by a converging lens, wherein said laser beams are respectively reflected by a plurality of reflecting mirrors having reflecting surfaces parallel to each other and guided to said converging lens, and said reflecting mirrors respectively have a mounting surface at a predetermined angle with respect to the reflecting surface and are secured to a common plane.

2. An apparatus as defined in claim 1 wherein said laser beams reflected by said reflecting mirrors are guided by a light deflector to said convergng lens.

3. An apparatus as defined in claim 1 wherein said reflecting mirrors are positioned so that the space between said laser beams reflected by said reflecting mirrors becomes smaller than the space between said laser beams impinging upon said reflecting mirrors.

4. An apparatus as defined in claim 3 wherein said space between said laser beams reflected by said reflecting mirrors is adjusted to a value within the range of 0.5 to three times the beam diameter.

5. An apparatus as defined in claim 1 wherein said semiconductor lasers are positioned above said reflecting mirrors, and said reflecting surfaces of said reflecting mirrors face up.

6. An apparatus as defined in claim 1 wherein said semiconductor lasers are positioned horizontally at different levels, and said reflecting surfaces of said reflecting mirrors face laterally.

* * * * *